Figure 1:
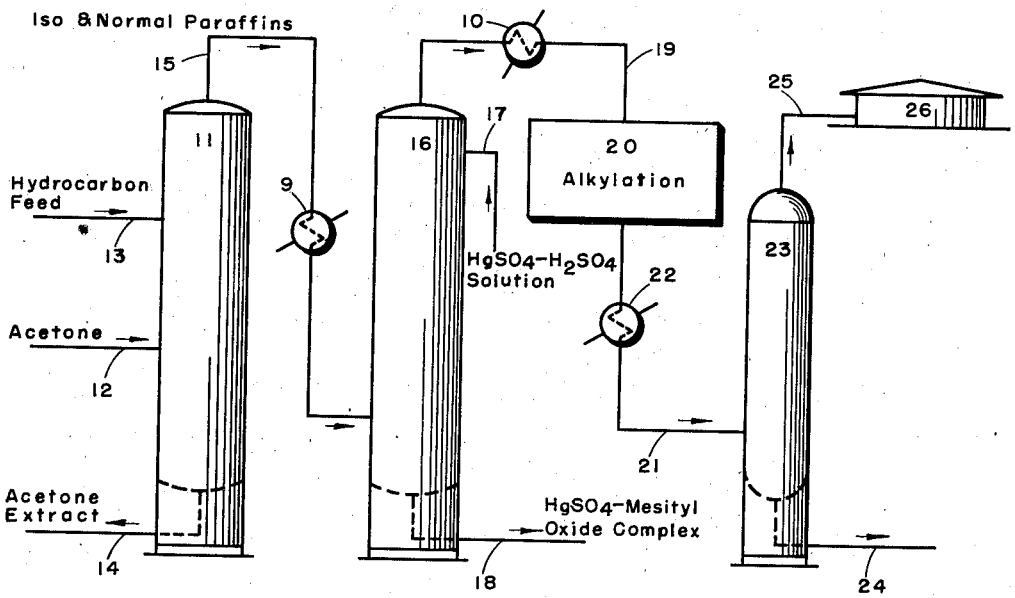

May 29, 1945.   J. T. HORECZY   2,377,081
PURIFICATION OF MOTOR FUEL COMPONENTS
Filed Jan. 24, 1944

Joseph T. Horeczy INVENTOR.
BY
J. D. McKean
ATTORNEY.

Patented May 29, 1945

2,377,081

UNITED STATES PATENT OFFICE 2,377,081

PURIFICATION OF MOTOR FUEL COMPONENTS

Joseph T. Horeczy, Baytown, Tex., assignor to Standard Oil Development Company, a corporation of Delaware Application January 24, 1944, Serial No. 519,437

9 Claims. (Cl. 260—683.4)

The present invention is directed to the purification of components suitable for use as a fuel for internal combustion engines, and particularly for those components suitable for use in high test aviation gasoline.

Hydrocarbon streams suitable for use as components for motor fuel are sometimes subjected to refinery operations which cause these streams to be contaminated with condensation products of acetone. For example, a fraction comprising olefins and normal and isoparaffins, such as butylenes, isobutane and normal butane, is sometimes extracted with acetone in an extraction tower to separate the olefins from the paraffins. The temperatures under which the extraction procedure is carried out usually range from 175° to 220° F., and under these conditions condensation products of acetone, such as mesityl oxide and phorone, are present in at least small amounts in the extraction tower. These condensation products are concentrated in the raffinate stream comprising the normal paraffins which are removed from the extraction tower. It is often desirable to utilize the isoparaffins in the raffinate in an alkylation reaction, and for this reason it is common for the mixture of iso- and normal paraffins removed from the acetone extraction tower to be sent to an alkylation zone which produces an alkylate suitable for use as a component in high test aviation gasoline. If the components separated as raffinate from the acetone extraction tower are not treated to remove the acetone condensation products therefrom, the resulting high test gasoline component has an objectionable odor and is unstable in storage.

In accordance with the present invention, components comprising a raffinate stream from an acetone extraction step and which are to be alkylated to produce a high test gasoline component are subjected to treatment with a solution of mercuric sulfate to remove acetone condensation products therefrom. The liquid contaminated with the condensation products of acetone may be treated with mercuric sulfate before it is used as a charge stock to an alkylation zone. Optionally, the stream contaminated with the acetone condensation product may be charged to an alkylation zone and the alkylate removed as product from the alkylation zone, treated with mercuric sulfate and the purified alkylate then employed as a component for aviation gasoline.

The mercuric sulfate is preferably added to the contaminated hydrocarbon stream in the form of a weak acidic solution. It is usually desirable to apply the acidic solution of mercuric sulfate in admixture with dilute sulfuric acid. The solution of mercuric sulfate reacts with the tertiary carbon present in the mesityl oxide and phorone to produce an insoluble complex of the organic compound and mercury. The exact composition of the resulting precipitate produced by the reaction of the mercuric sulfate and organic compound is not known, but approximately 6 moles of mercury are required per mole of organic compound removed from the hydrocarbon stream. It is preferred to conduct the reaction by admixing the hydrocarbon fraction with the aqueous solution of mercuric sulfate in admixture with dilute sulfuric acid, then allowing the admixture to settle into a hydrocarbon layer and an aqueous layer containing a suspension of the resulting precipitate and unreacted mercuric sulfate, and then withdrawing the hydrocarbon layer.

It is preferred to conduct the reaction between the mercuric sulfate and hydrocarbon fraction at temperatures within the range of 100° and 250° F. Below 100° F. the reaction proceeds at a rate too slow to be practical for commercial operations, and at temperatures above 250° F. there is danger that the mercury complex will decompose. The reaction time, that is the time during which the components should be in intimate contact, may range from one to 15 minutes, with the longer reaction time being required for the lower temperatures. The strength of the mercuric sulfate solution employed may be varied from 1% to a saturated solution. The sulfuric acid used in conjunction with the mercuric sulfate may have a concentration ranging from 10% to 30%. The ratio of mercuric sulfate solution to dilute sulfuric acid may be varied from 1% in 10% to 5% in 30%, with a preferred admixture of 5% mercuric sulfate solution in 20% sulfuric acid at an extraction temperature of 175° F.

Figure 2:
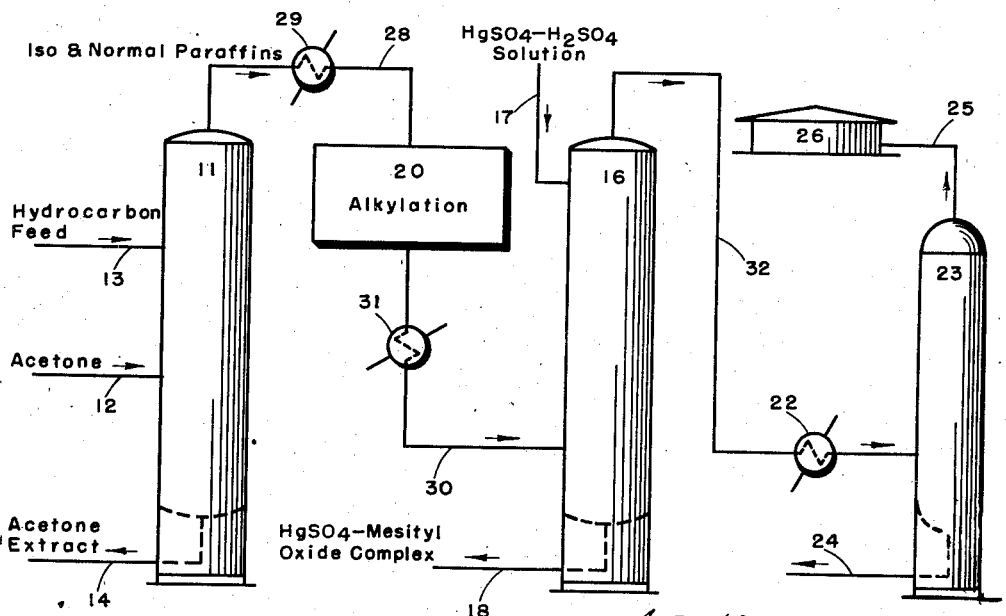

The invention will now be described in conjunction with the accompanying drawing, in which:

Fig. 1 is in the form of a flow sheet diagrammatically illustrating a procedure in which the acetone condensation products are removed from the stream charged to an alkylation step; and Fig. 2 is in the form of a diagrammatic flow sheet illustrating an alternate procedure in which the raffinate from an acetone extraction zone and contaminated with acetone condensation products is sent directly to the alkylation step and the alkylate removed as the product from the alkylation step is treated to separate acetone condensation products therefrom.

Turning now specifically to the drawing, and first to Fig. 1, an extraction column 11 is provided with an inlet line 12 for conducting acetone thereto and an inlet line 13 for supplying it with a mixture of olefins and paraffins, such as a mixture of normal butane, isobutane and butylenes. The lower portion of extraction tower 11 is provided with an outlet line 14 for withdrawing the acetone extract having olefins dissolved therein.

This extract may be withdrawn to suitable apparatus, not shown, for the separation of the olefins from the acetone and the subsequent utilization of the olefins.

An outlet line 15 communicates with the top of extraction tower 11 and serves for the withdrawal of the paraffinic raffinate contaminated, as previously explained, with condensation products of acetone. A heater 9 is arranged in line 15 to heat the raffinate within the range of 100° to 250° F. Line 15 conducts the heated raffinate to a lower portion of a second extraction tower 16. Near the top of the extraction tower 16 an inlet line 17 is provided for supplying to the tower a mixture of aqueous mercuric sulfate solution and dilute sulfuric acid solution which is preferably at the same temperature as the heated raffinate. This admixture of mercuric sulfate solution and sulfuric acid has a greater specific gravity than the hydrocarbon fraction supplied the tower, and accordingly flows downwardly countercurrent to the hydrocarbon fraction which flows upwardly through the tower. The heavy complex formed by the reaction of mercury with unsaturated hydrocarbon, such as mesityl oxide and phorone, is carried downwardly through the tower with the unreacted aqueous mercuric sulfate and sulfuric acid and is withdrawn from the bottom of the tower through line 18.

The heavy complexes formed by the reaction of mercuric sulfate with the unsaturated hydrocarbon derivative of acetone and withdrawn via line 18 may be decomposed to recover the mercury content by treatment with a weak solution of a chloride ion. Preferably, the decomposition is accomplished by treatment with aqueous hydrochloric acid of a strength of about 10%. The products resulting from treatment of the complex with the aqueous acid solution depend on the compound reacted with the mercuric sulfate. It may be stated as a general proposition that the original unsaturated reactants are regenerated. For example, when mesityl oxide is treated with mercuric sulfate and the resulting complex is subsequently treated with aqueous hydrochloric acid, mesityl oxide and mercuric chloride are obtained.

The purified hydrocarbon stream rises through the tower and is withdrawn from the upper end thereof by means of line 19. Line 19 contains chiller 10 and the hydrocarbon is chilled to a suitable temperature for alkylation by passing therethrough before it is conducted to the alkylation step, which is carried out in equipment indicated diagrammatically by unit 20. The alkylation of isoparaffins, such as isobutane, with other hydrocarbons, such as olefins, to form an alkylate product is now well known in the art. Suitable alkylation processes which may be employed for treating the isoparaffin charged to unit 20 are described, for example, in United States Patent No. 2,256,615, issued September 23, 1941, to Fred Hederhorst, and accordingly this step will not be described in any greater detail.

The alkylate is removed as a product from alkylation step 20 by means of line 21 and is passed through a suitable heating means 22 and to a distillation column 23. A heavy fraction is removed from the bottom of column 23 by means of line 24, and the remainder is suitable as a component for high test aviation gasoline and is withdrawn from the column as overhead by means of line 25 and is discharged to storage 26. The alkylate product in storage 26 may be blended, by means not shown, with an alkyl lead compound, such as tetraethyl lead and an oxidation inhibitor and other blending agents, to produce the desired blended aviation gasoline.

Another embodiment of the present invention is shown in Fig. 2. In this embodiment the extraction step of the mixture of olefins and paraffins by acetone solvent is conducted in extraction column 11 in exactly the same manner as the step previously described in Fig. 1, and the numerals designating the parts are the same as used in Fig. 1. The description of the extraction in column 11 will accordingly not be repeated.

The raffinate comprising isobutane and normal butane and contaminated with condensation products of acetone is removed from the top of extraction column 11 via line 28 passed through chiller 29 and thence to alkylation step 20. The alkylation of the hydrocarbon fraction in unit 20 is conducted in the same manner as the step conducted in unit 20 of Fig. 1. The alkylate removed as a product from alkylation unit 20 is withdrawn via line 30 and sent through heater 31 into a lower portion of extraction column 16, where it flows countercurrently to a solution of mercuric sulfate and sulfuric acid which is admitted into the column through line 17. It will be understood that the temperature conditions and concentrations of the solutions used in the extraction tower may be varied over the range disclosed previously. The aqueous fraction having suspended therein the hydrocarbon mercury complex and any unreacted solution is withdrawn from the bottom of extraction column 16 by means of line 18. The purified alkylate fraction, free from condensation products of acetone, is withdrawn from column 16 by means of line 32 and passes through heater 22 and into column 23. From column 23 a heavy fraction is withdrawn as bottoms by means of line 24 while the remainder is suitable as a component for high test aviation gasoline and is withdrawn as overhead via line 25 and discharged to storage 26. The alkylate fraction in storage 26 may be used as a motor fuel without further treatment, but preferably is admixed with a material for increasing the octane number, such as tetraethyl lead, oxidation inhibitors, and other addition agents, to produce the desired blended high test aviation gasoline.

The procedures described above in conjunction with Figs. 1 and 2 are both satisfactory for removing condensation products of acetone from the hydrocarbon fraction so that the treated fraction is suitable as a component for high test motor fuel. However, it will usually be found economically desirable to remove the acetone condensation products from the alkylate stream as described in conjunction with Fig. 2 in preference to the preliminary treatment of the charge stock before it is sent to the alkylation step. The desirability of the treatment shown in Fig. 2 over that of Fig. 1 is based on the consideration that the hydrocarbon stream must be chilled before it is sent to the alkylation step, and it is economically undesirable to heat the raffinate in order to remove the mesityl oxide and phorone therefrom and subsequently cool it before sending it to the alkylation step, when equally satisfactory results may be obtained by treating the alkylate and then sending the hot fraction from the treating step to the subsequent distillation step.

One particular advantage of operating in accordance with the embodiment shown in Fig. 1 of the present invention is the removal of tertiary olefins and diolefins from the alkylate feed streams. The mercuric sulfate solution reacts with tertiary carbon atoms and effectively removes these tertiary olefins by forming an insoluble mercury complex as explained hereinbefore. In alkylation it has been well established that the tertiary olefins are less desirable as an olefin feed than the primary and secondary olefins. The presence of tertiary olefins in the alkylation reactor results in increased consumption of sulfuric acid catalyst and formation of undesirable side reaction products as a result of the more reactive nature of the tertiary carbon olefins. It is, therefore, contemplated that the present invention may be employed to pre-treat olefin feed streams to alkylation operations for removal of tertiary olefinic materials which are less desirable as feed stocks.

The advantages obtained in the practice of the present invention are further shown by the following example, in which a comparison was made of the stability of an alkylate fraction which had been blended with tetraethyl lead and oxidation inhibitor, and from which mesityl oxide and phorone have been removed in accordance with the present invention, with a similarly blended alkylate fraction which had not been treated for the removal of acetone condensation products. The stability of the two alkylate fractions was established by a comparison of the "accelerated gum tests" as adopted by the Co-Operative Fuel Research Committee of the Society of Automotive Engineers and published by that committee in "Test Procedures and General Information in Current Use in the Development and Utilization of Aviation, Motor and Automotive Diesel Fuels," May, 1941, page 15. The fraction containing mesityl oxide had an "accelerated gum" content of 6 mg., while that which had been treated in accordance with the present invention had an "accelerated gum" content of only 3 mg., the latter figure being well within specification figures for aviation fuel, while the former is outside the desirable range. It was also observed that the containers in which the fraction containing mesityl oxide was stored became coated with a resinous deposit, indicating that the condensation products of acetone are harmful to the aviation fuel.

While I have given specific examples in illustrating the practice of the present invention, it is to be understood that these examples are not given by way of limitation, but for illustrative purposes only.

The nature and objects of the present invention having been thus described and illustrated, what I desire to claim as new and useful and to secure by Letters Patent is:

1. In a process for producing a high test gasoline including the steps of contacting a hydrocarbon mixture with acetone to form an extract fraction and a raffinate fraction, subjecting at least a portion of the raffinate to alkylation conditions in an alkylation zone and removing an alkylate as product from the alkylation zone for inclusion in the high test gasoline, the step of treating hydrocarbon components which are subjected both to extraction and to alkylation conditions in the alkylation zone with mercuric sulfate under conditions to separate acetone condensation products therefrom.

2. In a process for producing an alkylate suitable for inclusion in a high test gasoline including the steps of solvent extracting a hydrocarbon mixture with acetone to produce a raffinate and an extract and charging the raffinate to the alkylation step, the step of treating at least a portion of the raffinate with mercuric sulfate solution under conditions to remove acetone condensation products therefrom before said raffinate is charged to the alkylation step.

3. In a process for treating hydrocarbons to produce an alkylate fraction suitable for inclusion in a high test gasoline including the steps of extracting a hydrocarbon mixture with acetone to form a raffinate and an extract and subsequently passing the raffinate to the alkylation step, the step of treating at least a portion of the alkylate removed as product from the alkylation step with mercuric sulfate under conditions to remove acetone condensation products therefrom.

4. A process for treating hydrocarbons comprising the steps of passing a mixture of olefins and paraffins to an extraction zone and contacting the mixture with acetone under conditions to form a first extract fraction and a first raffinate fraction, passing the first raffinate fraction to a second extraction zone, and there contacting it with a mixture of mercuric sulfate solution and dilute sulfuric acid solution to form a second extract fraction and a second raffinate fraction, passing the second raffinate fraction to an alkylation step and maintaining it under conditions therein to cause the alkylation of at least a portion thereof, and removing an alkylate as product from the alkylation step.

5. A method in accordance with claim 4 in which the second extraction zone is maintained at a temperature in the range of 100° to 250° F.

6. A method in accordance with claim 4 in which the second extraction zone is maintained at a temperature in the range of 100° to 250° F. and the mercuric sulfate is in the form of an aqueous solution having a concentration in the range of 1% to a saturated solution.

7. A method of treating hydrocarbons comprising the steps of passing a mixture of paraffins and olefins to a first extraction zone and contacting the mixture with acetone therein under conditions to form a first raffinate and a first extract, passing the raffinate to an alkylation zone maintained under conditions to cause the alkylation of at least a portion of the components of the first raffinate, removing alkylate as product from the alkylation zone, passing the alkylate to a second extraction zone and contacting it therein with a mixture of mercuric sulfate solution and dilute sulfuric acid solution maintained under conditions to remove acetone condensation product from the alkylate.

8. A method in accordance with claim 7 in which the second extraction zone is maintained at a temperature in the range of 100° to 250° F.

9. A method in accordance with claim 7 in which the second extraction zone is maintained at a temperature in the range of 100° to 250° F. and the mercuric sulfate is in the form of an aqueous solution having a concentration in the range of 1% to a saturated solution.

JOSEPH T. HORECZY.